Feb. 24, 1959     W. H. GRIGGS ET AL     2,875,054
PREPARATION OF COATINGS OF IMPROVED INTERNAL STRENGTH
Filed May 24, 1956

WILLIAM H. GRIGGS
HENRY G. CURME
INVENTORS

BY
ATTORNEYS

United States Patent Office 2,875,054
Patented Feb. 24, 1959

2,875,054

PREPARATION OF COATINGS OF IMPROVED INTERNAL STRENGTH

William H. Griggs and Henry G. Curme, Rochester, N. Y., assignors to Eastman Kodak Company, Rochester, N. Y., a corporation of New Jersey Application May 24, 1956, Serial No. 587,155

7 Claims. (Cl. 96—85)

This invention concerns an improved paper coating composition, particularly a binder for pigment coatings having improved internal strength.

Photographic paper customarily contains a baryta coating which provides a high reflective quality to photographic prints. This baryta pigment must be carried in a binding material such as gelatin or the like, and is often applied to paper by using compositions of quite high pigment to binder ratios, which may be up to 10:1 pigment to binder. The coating as such, unless it is protected by, or contains, an excellent binder, is quite weak, crumbly, and subject to abrasion especially when wet.

Great care must be taken in providing a support for photographic emulsions to insure that the support is compatible with the emulsion as well as providing a high reflective coating and a flexible binder. It has been found by Clark, U. S. patent application Serial No. 112,408, abstract published September 29, 1953, that improved baryta coating compositions are obtained by substituting for the gelatin or other ordinarily employed binder, a styrene-butadiene latex either in whole or in part, but at least 25% of the binder. Baryta compositions thus prepared have good keeping qualities, exhibit no adverse effect upon the sensitive qualities of the emulsion, and the coatings thereof exhibit better flexibility than regular baryta coatings.

Mixtures of zinc oxide and organic resin binders have been found to be photoconductive in electrostatic printing processes. The electrostatic process is described in the RCA Review, December 1954, pp. 469–484, in an article entitled "Electrofax." A wide variety of organic binders may be used for this purpose provided that they are coated out of organic solvent systems, depending on their solubility. Pigment-to-binder ratios may range from 15:1 to nearly 1:1. However, coatings made from aqueous dispersions, in which the resin binder is dispersed as a latex, lose their charge very much more quickly than the same systems coated from an organic-solvent. In many cases the coatings of aqueous dispersions lose their charge so quickly that no print can be made. Advantages of coating aqueous dispersions include the elimination of problems of vapor disposal and solvent recovery.

We have found that by applying a pigment coating of high pigment-binder ratio with a styrene-butadiene resin binder, we can greatly improve the internal strength of the coating by treating the coating with heat. When used as a base for a photographic emulsion, the styrene-butadiene resin binder which has been fused or melted on the paper, prevents migration of the silver grains with sensitization of the grains and resultant dark spots.

When the styrene-butadiene resin binder is used with zinc oxide pigment for electrostatic printing purposes and the binder has been fused or melted on the paper, electrostatic prints of good quality may be obtained. If the coatings are not heat-treated, they lose their charge too quickly to make prints on them.

One object of this invention is to provide a pigment-binder coating composition having improved internal strength. Another object of our invention is to provide a baryta coating composition in which the solids content is higher than has been formerly considered possible. A further object of our invention is to provide baryta coatings which are much smoother than the usual baryta coatings and with a higher degree of gloss. An additional object is to provide usable electrostatic printing compositions in which the binders are coated as aqueous latex dispersions. Another object of our invention is to provide a photographic paper which has improved resistance to abrasion especially when wet. A still further object is to provide a paper coating for use under a photographic emulsion which prevents migration of silver grains.

The above objects are accomplished by substituting, for the gelatin or other binder ordinarily employed in baryta coatings, either in whole or in part or in zinc oxide coatings, a styrene-butadiene latex.

These coatings are treated by heating the binder to a temperature within the range of 275° to 375° F. Our preferred method embodies the use of infra-red heaters. The paper is predried, then passed in front of infra-red heaters to fuse the resin-baryta mixture. The optimum temperature is from 300° to 320° F. We have found that the ratio of styrene to butadiene can be varied from 60:40 to 70:30 for good results, and a ratio as low as 80:20 is operative. We have also found that the ratio of pigment to binder can be varied from less than 1:1 up to at least 15:1 for baryta coatings, from less than 1:1 up to about 5:1 for zinc oxide coatings. Other methods may also be used to heat the paper and melt the coating.

The styrene-butadiene latices are prepared according to the process disclosed in U. S. Patent No. 2,537,114, issued to Young et al.

After the latex is prepared, it is mixed with a dispersion of blanc fixe in a styrene-maleic acid ammonium salt or similar dispersion agent for the preparation of a baryta coating, either with some other binder or as the sole binder employed, the latex replacing at least 25% of the binder ordinarily employed (usually gelatin) based on dry weight. An aqueous solution of a dispersing agent is added to the dry zinc oxide before adding the latex. A hardener may be included in the blanc fixe composition which acts to increase the resistance of the coating to water. Formaldehyde has been found to be satisfactory in this connection, but other hardeners may be employed such as glyoxal, water soluble melamine-formaldehyde resin, water-soluble urea formaldehyde resin, water soluble maleic acid-styrene-$NH_3$ resin, or if an inorganic hardener is desired, a material such as chromium chloride.

When used with zinc oxide as a coating for electrostatic paper, the prepared latex is mixed with a dispersion of zinc oxide, either with some other binder or as the sole binder employed, the latex comprising at least 25% of the binder employed.

The accompanying drawing shows two embodiments of our invention:

Fig. 1 shows a support carrying a silver halide coating over a pigment-binder coating which may be baryta in a binder of styrene-butadiene resin and gelatin or the like.

Fig. 2 shows a support having a coating of zinc oxide carried in a binder which may be styrene-butadiene resin or the like.

Figure 1:
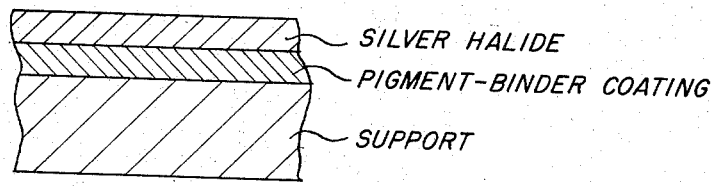
Figure 2:
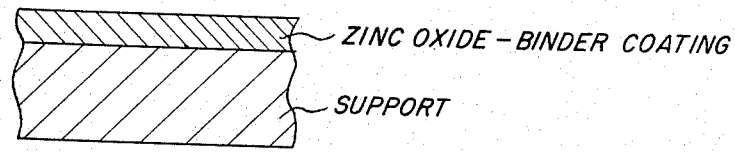

The following examples illustrate, but do not limit, our invention.

Example I

A suitable baryta coating composition was made up using the following formula:

|  | Dry, gms. | Wet, gms. |
|---|---|---|
| Blanc fixe | 1,000 | 1,775 |
| Maleic Acid-Styrene-NH₃ Resin | 10 | 200 |
| Styrene-butadiene resin containing about 60% styrene and 40% butadiene polymerized in the presence of water to give a stable resin emulsion | 100 | 208 |
| Water |  | 737 |

This composition, which has a pigment-binder ratio of 10:1, was applied at a coating weight of 56 gms./m.² on 27 lb./1000 sq. ft. photographic base stock. One-half of the coated roll was brought to a temperature of 250°–320° F. in about 15 seconds by passing it in front of a bank of infra-red heaters and melting the coating.

Samples of both the heat treated and non-heat treated paper were immersed in a weak alkaline solution (photographic developing solution). The non-treated baryta coating was very friable and subject to abrasion. The melted-on baryta coating was very tough and was not subject to abrasion or other poor handling difficulties.

The blanc fixe in the above formula can be made by either the barium chloride, barium carbonate, or similar precipitation process. Titanium dioxide, clay, or similar pigment can be used in place of the barium sulfate.

Example II

Baryta compositions were made up according to the formula of Example I except the pigment-binder ratios were 7:1, 8:1, and 9:1. After coating and heat treating as in Example I, the samples were immersed in a photographic developer. Again the heat treatment rendered the coating more resistant to abrasion and other handling difficulties.

Example III

Baryta compositions were made up as in Examples I and II except that the binder was composed of 75 parts of a styrene-butadiene resin containing about 60% styrene and 40% butadiene polymerized in the presence of water to give a stable resin emulsion, and 25 parts of gelatin by solids weight. The baryta was coated, heat treated and tested with results comparable to those in Examples I and II.

Example IV

Compositions were made up according to the formula in Example I. The coating was applied as 2–28 gm. coats instead of 1–56 gm. coat. Results were comparable.

Example V

Compositions were made up according to the formula in Example I. The coating was applied to a 52 lb. stock instead of a 27 lb./1000 sq. ft. stock. Results were comparable.

Example VI

Compositions were made up according to the formula in Example I except that the following materials were used as binders in place of a styrene-butadiene resin containing about 60% styrene and 40% butadiene polymerized in the presence of water to give a stable resin emulsion.

(1) Butyl acrylate, styrene, methacrylamide (58.8%, 25.2%, 16.0%) copolymer.
(2) Butyl acrylate, styrene, maleated glue (49%, 21%, 30%) copolymer.
(3) Butyl acrylate, acrylonitrile, maleated glue (49%, 21%, 30%) copolymer.

The coatings were applied, heat treated, and tested as in Example I with comparable results.

Example VII

Compositions were made up according to the formula in Example VI except that gelatin was used as a dispersing agent instead of maleic acid-styrene-NH₃ resin.

Example VIII

Compositions were made up according to any of the above examples and were coated at a weight of 56 gms./sq. m. on 27 lb./100 sq. ft. photographic base stock. The coating was heat treated as previously described and a 3 gm./sq. m. size coating composed of 60 parts of a styrene-butadiene resin containing about 60% styrene and 40% butadiene polymerized in the presence of water to give a stable resin emulsion, and 40 parts of gelatin by solids weight was applied over the coating. A suitable photographic gelatinous-silver halide emulsion was applied to the prepared coating. The photographic paper was processed in the normal manner together with a similarly prepared (but without heat treatment) comparison. It was noticed during processing that the bond at the size-baryta interface was very weak on the non-heat treated comparison but was quite satisfactory on the heat treated stock.

Example IX

Compositions were made up, coated, and heat treated as in Example VIII. A 3 gm./sq. m. size coating composed of the binders listed in Example VI with, or without the addition of 25–50 parts gelatin (by solids weight) was applied over the baryta coating. The prepared base was then sensitized and tested as in Example VIII with comparable results.

Example X

One hundred parts of zinc oxide were dispersed in an aqueous solution of 1 part (dry weight) styrene-maleic acid ammonium salt; and 33 parts (dry weight) of styrene-butadiene latex containing about 60% styrene and 40% butadiene were added. This was applied to photographic raw stock, dried, and brought to a temperature of 320° F. for 5 minutes in an air oven. Good electrostatic prints were obtained, while no prints were obtained with coatings which had not been heated.

Example XI

Coatings similar to those in Example X, but with pigment:binder ratios of 5:1, 4:1 and 2:1, were heated similarly. Good prints were obtained.

Example XII

Coatings similar to those in Examples X and XI were made, except that the dispersing agent was "Calgon," a commercial polyphosphate. (According to the Handbook of Material Trade Names "Calgon" is a trade name of Calgon, Inc.) Similar results were obtained.

Example XIII

Coatings similar to those of Example X were made, except that "Everflex A" and "Everflex G" (internally plasticized polyvinyl acetate latexes—trade names of Dewey and Almy Chemical Co.) were used as the binder. Good electrostatic prints were obtained when the coatings were heat treated, while poor or no prints were obtained with the untreated coatings.

Although some of the above tests were run by ovenheating the samples, we have found that very rapid heating can be obtained with infra-red heaters and that results are entirely comparable with those obtained by oven heating.

The pigment-binder coating may be applied to the paper either by means of an air knife, a brush machine, or by any other conventional coating machine. After the coating has been applied to the paper, it is then dried thereon such as by festooning the paper in a warm, dry atmosphere, and then heat treated to melt the binder.

The baryta coatings which have been fused according to our invention and size coated as above, are resistant to the excessive penetration of the silver emulsion into the baryta layer with the risk that reduction of the silver ion will occur in the baryta layer.

Our preferred embodiment of this invention concerns photographic base stock, but our invention may also be used with other types of paper and for other purposes. A photographic base stock prepared according to our invention using a baryta-binder may be coated with a photographic emulsion containing light-sensitive silver salts for use in making photographic prints.

The particular photographic emulsion used with our heat treated binder is not critical. However, suitable emulsions are illustrated by E. J. Wall in his book, "Photographic Emulsions," published in Boston by the American Photographic Publishing Co., 1929. Printing Paper Emulsions are found in chapter VI, pages 101–134.

Zinc oxide-styrene-butadiene resin coatings may be prepared also using a solvent mixture of the styrene-butadiene resin. However, using such a coating requires the use of solvent recovery equipment which is not normally found in paper coating equipment and which is expensive to install. In the event that such a solvent mixture were used, the heat treatment of our invention improves the behavior of the coatings provided the solvent were removed by conventional drying methods and the coating fused in a suitable manner such as by passing before infra-red heaters.

Coating styrene-butadiene latices incorporating zinc oxide as a pigment is preferably done by keeping surfactants and other ionic components to a minimum, inasmuch as it is essential to avoid conductivity in the resin binder such that the charge might be dissipated readily. In addition, compositions which might become carbonized at the temperature which fuses the binder should also be either removed or avoided in coating the latex which is to be heat treated. Some surfactants may be removed from the resin binder by washing with a suitable solvent.

This application is a continuation-in-part of our application Serial No. 418,228, filed March 23, 1954, now abandoned.

We claim:

1. A method for preparing paper for photographic purposes which comprises coating the paper with a coating composition containing barium sulfate pigment and at least 25% of a styrene-butadiene resin produced by emulsion polymerization of the monomers, containing about 60% by weight styrene and 40% by weight butadiene, solids basis, drying the coating, fusing the coating at a temperature within the range of 275–375° F. and coating with a light-sensitive gelatinous silver halide emulsion.

2. A process according to claim 1 in which the pigment binder ratios are within the range of 1:1 up to 15:1.

3. A photographic paper comprising a support containing as a layer thereon a baryta coating consisting essentially of barium sulfate held by a melted-on binder comprising a copolymer of from 60–80% by weight styrene and from 20–40% by weight butadiene produced by emulsion polymerization of the monomers, and having a light-sensitive silver halide emulsion coating superimposed over the baryta coating.

4. A process for preparing paper for photographic purposes comprising applying to the paper coating composition which comprises a suspension of a pigment selected from the class consisting of barium sulfate and zinc oxide in a binder containing 25–100% by weight, solids basis, styrene-butadiene resin latex containing from about 60–80% by weight styrene and from 40–20% by weight butadiene formed by emulsion polymerization and fusing the coating at a temperature of from about 275–375° F.

5. A method for preparing paper for electrostatic printing purposes which comprises coating the paper with a coating composition containing a zinc oxide pigment and a styrene-butadiene produced by emulsion polymerization of the monomers containing about 60–40% by weight styrene-butadiene, drying the coating and fusing the coating at a temperature within the range of 275–375° F.

6. A process according to claim 5 in which the pigment binder ratios are within the range 1:1 to 5:1.

7. An article of manufacture which comprises a support containing as a layer thereon a zinc oxide coating consisting essentially of zinc oxide held by a melted-on binder comprising a copolymer of styrene and butadiene produced by emulsion polymerization of the monomers, containing from about 60–80% by weight styrene and from 40–20% by weight butadiene.

References Cited in the file of this patent

UNITED STATES PATENTS

| | | |
|---|---|---|
| 1,746,888 | Esselen et al. | Feb. 11, 1930 |
| 1,982,018 | Owen | Nov. 27, 1934 |
| 2,537,114 | Young et al. | Jan. 9, 1951 |
| 2,597,087 | Cowgill | May 20, 1952 |
| 2,662,040 | Thomas | Dec. 8, 1953 |
| 2,685,538 | Stinchfield et al. | Aug. 3, 1954 |
| 2,721,801 | Clark et al. | Oct. 25, 1955 |
| 2,725,981 | Abere et al. | Dec. 6, 1955 |
| 2,735,784 | Greig et al. | Feb. 21, 1956 |
| 2,748,029 | Spear et al. | May 29, 1956 |

OTHER REFERENCES

Clark: Abstract, vol. 674, page 1365, O. G. September 29, 1953.